Figure 1:
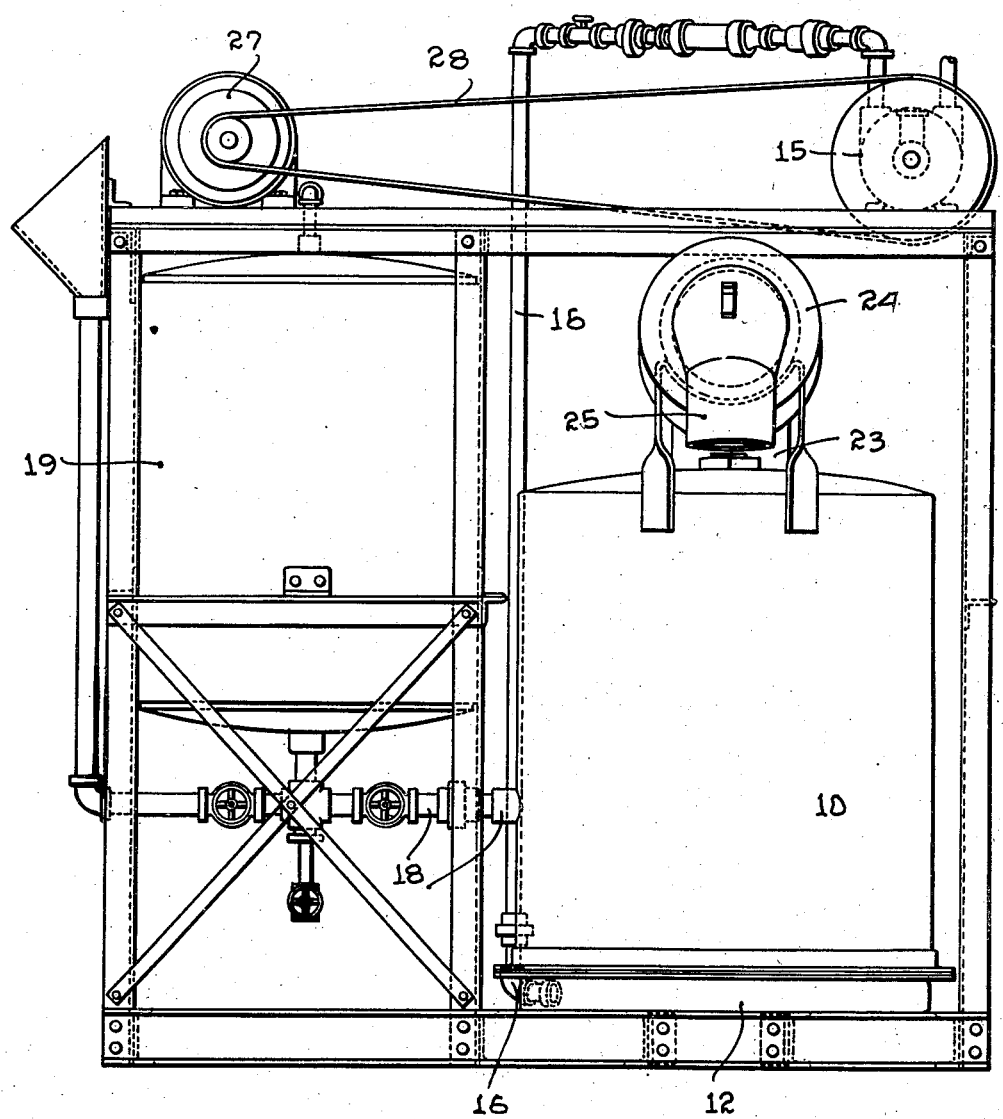

April 8, 1930.  J. A. RICE  1,753,429
APPARATUS FOR PRODUCING FOAM
Filed Oct. 26, 1926  4 Sheets-Sheet 1

Inventor
JOHN A. RICE.
By
Attorney

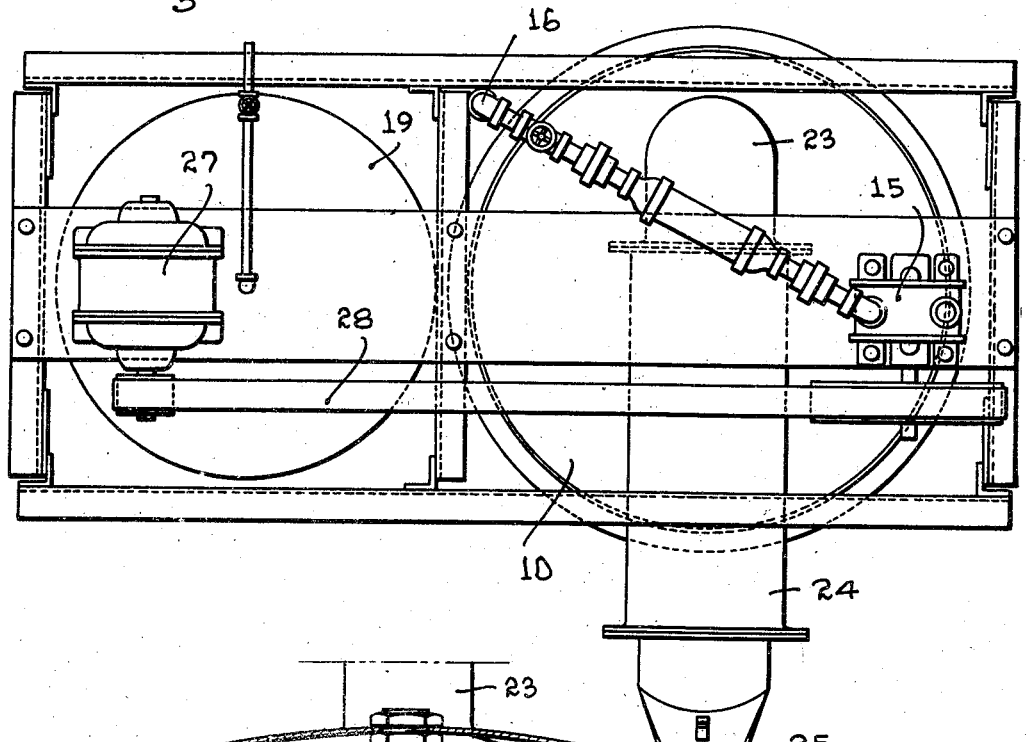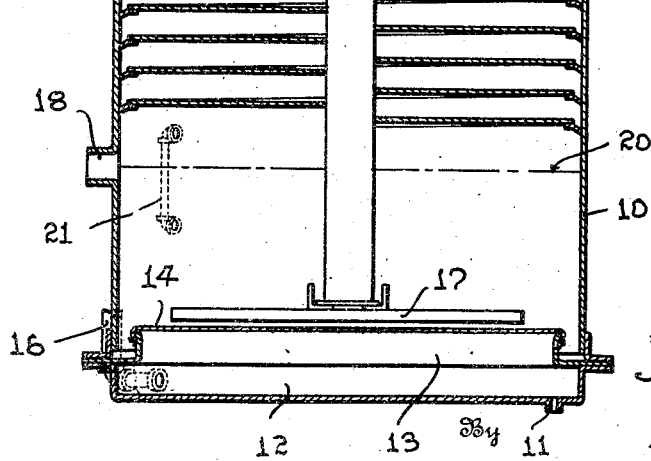

April 8, 1930. J. A. RICE 1,753,429
APPARATUS FOR PRODUCING FOAM
Filed Oct. 26, 1926    4 Sheets-Sheet 3

Inventor
JOHN A. RICE.
By
Attorney

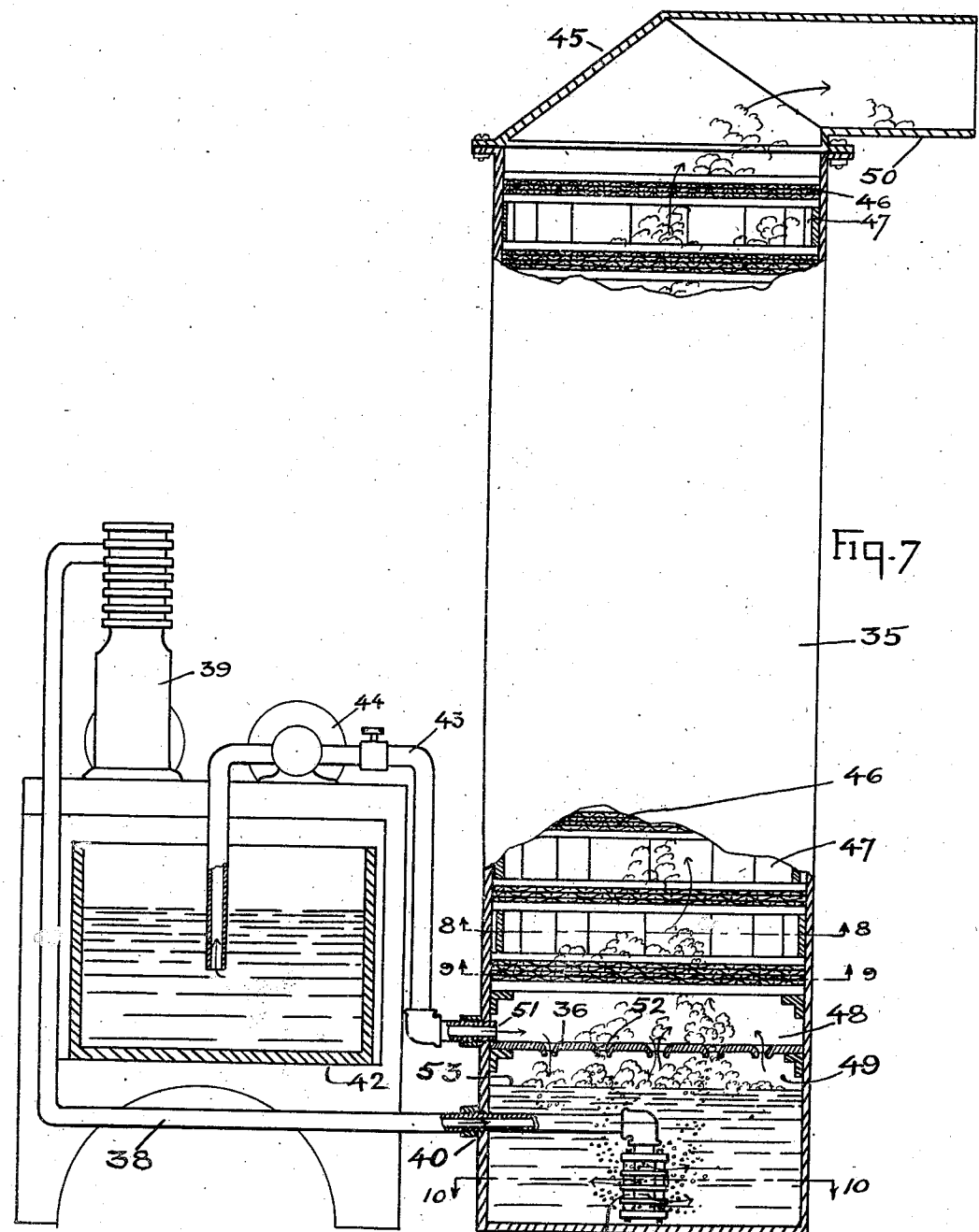

Patented Apr. 8, 1930

1,753,429

UNITED STATES PATENT OFFICE

JOHN A. RICE, OF BERKELEY, CALIFORNIA, ASSIGNOR TO THE BUBBLESTONE COMPANY, OF PITTSBURGH, PENNSYLVANIA, A CORPORATION OF PENNSYLVANIA

APPARATUS FOR PRODUCING FOAM

Application filed October 26, 1926. Serial No. 144,389.

The present invention relates to a process for making a foam or lather, having qualities suitable for the manufacture of cellular concrete or cement, and to an apparatus for producing the foam.

An object of the invention is to produce, intermittently or continuously, any desired amount of foam or lather which will possess the correct texture and necessary quantity of liquid to obtain the best results in concrete and cement manufacture. The use of the foam thus produced is clearly and fully set forth in my copending applications for U. S. patents, to wit:

"Cellular cement and process for making same," Serial No. 608,349, filed December 21 1922.

"Process for making cellular cement," Serial No. 634,370, filed April 24, 1923.

"Cellular cement and process for making same," Serial No. 716,824, filed May 29, 1924.

"Process for making porous product," Serial No. 716,825, filed May 29, 1924.

"Process for making a foamy body," Serial No. 728,279, filed July 26, 1924.

With this object in view I cause a saponaceous solution to be thoroughly saturated with air in order to produce an abundance of bubbles thereby turning the solution into a light and voluminous froth. By suitably applied pressure in a closed vessel this froth is carried upwardly therein and made to enter an inclined passage which opens into a cylindrical drum that is also slightly inclined. Any surplus water in the solution is thereby gradually drained off from the frothy mass and returned along the downwardly inclined bottom of the drum and through the passage into the bottom of the vessel. The frothy substance, on the other hand, is caused by pressure to continue its upward travel and when passing through the drum encounters a series of screens, by means of which the light frothy particles are broken up into smaller ones in order to substantially increase the wall surface of the particles.

I preferably utilize two closed cylindrical vessels erected side by side in a stand or frame-work. One of these vessels is intended for feeding a saponaceous solution into the other vessel, and the latter, by its peculiar, though simple, construction and by the aid of an air current, operates to turn the solution into a light frothy substance. To drive the frothy substance through the second vessel, I preferably employ compressed air obtained from any suitable compressor such as a rotary pump, but with a view to simplicity I prefer to use a common source of compressed air to produce the foam and to move it.

In order to gain these results in a practical and economic manner, I have constructed a simple apparatus which is illustrated in the accompanying drawings and which forms one embodiment of the invention, and wherein—

Figure 4:
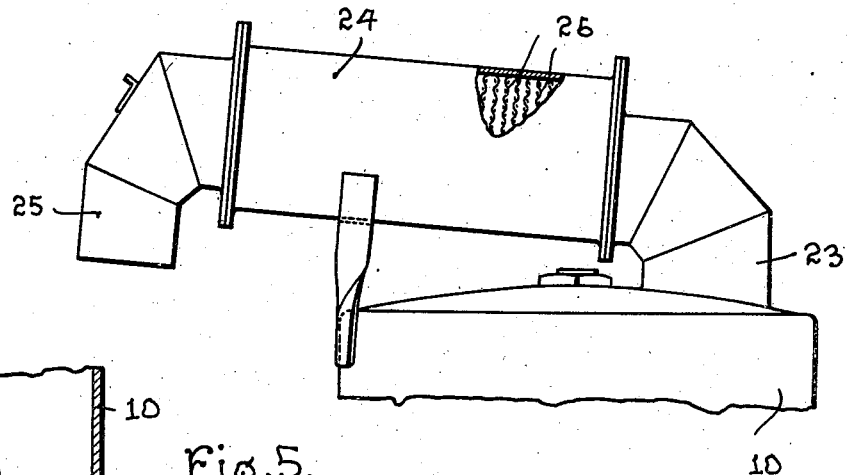
Figure 5:
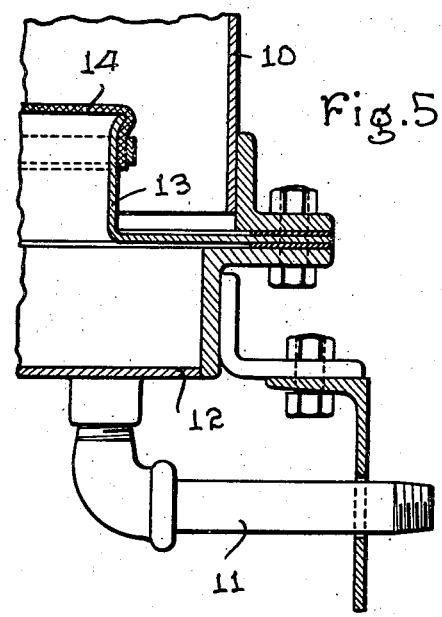
Figure 6:
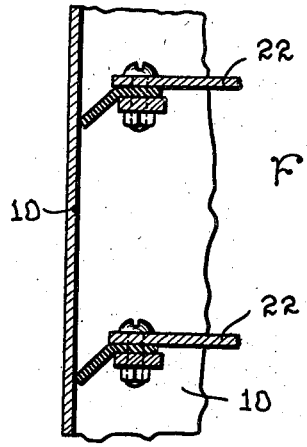

Figure 1 is an elevational view of the apparatus complete;

Figure 2 a top plan view thereof;

Figure 3 a vertical sectional view of the closed vessel in which the foam is produced;

Figure 4 a side elevational view of the top portion of the closed vessel;

Figure 5 a fragmentary vertical section of the bottom portion of the vessel;

Figure 6 a fragmentary vertical section of a side portion of the vessel;

Figure 7 an elevation and partial section of a closed vessel similar to Figure 3 but showing a slight modification.

In the drawings reference character 10 represents a closed metallic vessel preferably of cylindrical shape and having a drain pipe 11 at its bottom 12. A short distance from the bottom is situated a coaming 13, that is to say, a circular plate with an upstanding cylindrical collar, which is attached to the side of the vessel and is carrying a suitable diaphragm 14 of cloth or other permeable material, fine meshed as used in flotation cells in order to compel an air jet passing thru the diaphragm or septum to be finely subdivided into numerous fine streams.

From a suitable source of pressure, such as an air pump 15, compressed air at a pressure of about seven pounds per square inch, is conducted to the lower part of the vessel 10 by a pipe line 16. Immediately above the diaphragm is suspended a grid 17 (Figure 3), and liquid is supplied through a conduit 18 connected to communicate with a hydrostatic pressure container 19 for continuous operation of the apparatus. The pressure may be automatically controlled to keep constant the level 20 of the liquid by means of a float on its surface. A gage glass 21 may be provided for observing the level of the liquid.

The upper portion of the vessel contains a series of circular plates or disc like members 22 arranged to form a continuous helical passage from the level 20 of the liquid, or foaming solution, to the top of the vessel 10. This helical passage prolongs the transit of the solution upwards in order to obtain a thorough co-mingling of the ingredients and increase the foam production and it opens into a duct 23 which leads into a preferably cylindrical chamber or drum 24 above the vessel 10. The outer end of the drum has a discharge spout 25. The drum 24 is fitted with a plurality of screens 26 of wire mesh or perforated metal plates that are arranged diametrically therein, and said drum is slightly inclined upwardly from the duct 23, so that any surplus liquid in the foam solution may drain back into the vessel. The screens 26 are preferably made of galvanized wire mesh, e. g. one-fourth (¼) inch and one-eighth (⅛) inch, though other size mesh may be used depending on the length of the drum 24. A motor 27 having a belt 28 is provided for running the air pump 15.

The operation of the apparatus is as follows:

The vessel 10 is charged to the level 20 from the tank or container 19 through the conduit 18 with a suitably prepared foam forming solution with or without a foaming agent such as rosin soap, soap bark, or other saponaceous material. Through a pipe line 16 compressed air is led in at the bottom of the vessel from an air compressor 15 capable of supplying air in sufficient quantity and at a pressure, about seven atmospheres, sufficient to drive it through the diaphragm 14 into the solution thereby forming small bubbles in the latter. These bubbles will rise to the level 20 of the solution, there collecting to form a mass of wet foam.

As the operation proceeds, foam thus formed will continuously collect on the surface, thus forcing the previously formed foam to rise and enter the helical passage 30. The air current will compel the foam to proceed upwardly through the duct 23 into the chamber or drum 24 and force it through the screens 26. This action serves to break up or subdivide the particles of the foam into small cells, thus increasing the exposed cell surface contained in a given volume. This results in increasing the viscosity of the foam so that it will not impart an undue amount of liquid to a cement mix to which the product of the apparatus may be added.

The sloping bottom of the drum 24 and the inclined helical passage 30 will serve to drain off all surplus water from the foam and return it to the bottom of the vessel 10.

In Figure 7 is shown a modified form of the invention somewhat simplified. As before, a closed metallic vessel 35 preferably cylindrical is provided with a diaphragm 36 of perforated metal a short distance above the bottom 37 of the vessel. About midway between the diaphragm 36 and the bottom 37 a pipe 38 leading from a pump or other air compressor 39 enters as at 40 through the side of the vessel and is downwardly directed and terminates with a perforated cage or sprayer 41 through which the finely comminuted air enters the space below the diaphragm over its entire area.

At 51 immediately above the diaphragm 36 is shown an inlet for the foaming solution which is carried from a tank 42 through a pipe 43 actuated by a pump 44.

At regular intervals between diaphragm 36 and the covered top 45 of the vessel is provided a series of screens 46 of wire mesh of different grading, and other star-shaped spacers 47 are inserted in the spaces between the screens 46 to maintain the proper distance between them.

In the top 45 is provided a discharge spout 50 from which the foam is collected.

The operation of the apparatus illustrated in Figure 7 is very similar to that already described with regards to Figures 1 to 6 and proceeds as follows:

Frothing solution is pumped into the space 48 above the diaphragm 36 from the tank 42 by the pump 44 through the opening 51 of the pipe 43. The solution will first drop down through the perforations 52 in the screen and collect in the bottom chamber 49 to the level 53. Compressed air from the pump 39 is admitted to the lower chamber 49 under the diaphragm 36 through the pipe 38 entering like small bubbles through the sprayer 41 and rising up through the perforations 52 in the diaphragm. In passing up through the frothing solution in the lowermost space 48 it then forms a foam with said solution. The air pressure thereupon carries the foam, which is now very wet and consists of coarse bubbles, up through the first one of the screens 46. The large bubbles will then be cut up into smaller ones thereby increasing the film surface and making the foam more dry. The superfluous water from the foam will then drop down through the perforations 52 in the diaphragm 36 and collect in the bottom chamber 49, there to mingle with the incoming air to form more foam.

As the screen 46 constitutes a partial baffle against the rising foam, the latter is compelled to circulate and completely fill the space 48, thus overcoming any tendency to form channels of wet foam and is made homogeneous. The foam then passes up through the next space and screen and is still further broken up and made more homogeneous. When it has finally passed through all the screens and spaces it collects in the discharging spout 50 as a very homogeneous and fairly dry foam without the aid of any mechanical action.

It is to be understood that the invention as here disclosed is not limited to the details of construction shown and described, and these may be varied widely without departing from the spirit of the invention as defined by the claims.

What I claim as new is:

1. In an apparatus for continuously forming a comminuted foam, a container, means to supply a foaming liquid to such container, means to supply subdivided air below the surface of said foaming liquid, and walls forming a circuitous passage to transport foam actuated by the air supply means away from the liquid.

2. In an apparatus for continuously forming a comminuted foam, a container, means to supply a foaming liquid to such container, means to supply subdivided air below the surface of said foaming liquid, walls forming a helical passage to transport foam actuated by the air supply means away from the liquid, and means to subdivide said foam.

3. In an apparatus for continuously forming a comminuted foam, a container, means to supply a foaming liquid to such container, means to supply subdivided air below the surface of said foaming liquid, walls forming a helical passage to transport foam actuated by said air supply means away from the liquid, and means to subdivide and drain said foam.

4. In an apparatus of the class described comprising a closed vessel adapted to receive a suitable liquid for making a saponaceous foam, a dispersing diaphragm in the vessel; a circuitous passage formed between the dispersing diaphragm and the top of the vessel, a drum connected with the vessel having a plurality of screens and means for aerating the liquid to cause it to flow through the circuitous passage and the screens in the order given.

5. In an apparatus of the class described, comprising a closed vessel adapted to receive a suitable liquid for making saponaceous foam, a coaming raised above the bottom of the vessel, a dispersing diaphragm over said coaming, a circuitous passage formed between the dispersing diaphragm and the top of the vessel, a drum above the vessel connected with the upper end of said passage, and means for aerating the liquid and forcing the resulting foam through the circuitous passage and the drum.

6. An apparatus of the class described, comprising a closed vessel adapted to receive a suitable liquid for making saponaceous foam, a coaming raised above the bottom of the vessel, a dispersing diaphragm over said coaming, a circuitous passage formed between the dispersing diaphragm and the top of the vessel, a drum above the vessel connected with the upper end of said passage and means for aerating the liquid and forcing the resulting foam through the circuitous passage and the drum, said passage and said drum being upwardly inclined, thereby causing surplus liquid to return to the bottom of the vessel.

7. An apparatus of the class described, comprising a closed vessel adapted to receive a suitable liquid for making saponaceous foam, a coaming raised above the bottom of the vessel, a dispersing diaphragm over said coaming, a circuitous passage formed between the dispersing diaphragm and the top of the vessel, a drum above the vessel connected with the upper end of said passage, a plurality of screens in the drum, and means for aerating the liquid and forcing the resulting foam through the circuitous passage and the drum.

8. An apparatus of the class described, comprising a closed vessel adapted to receive a suitable liquid for making saponaceous foam, a coaming raised above the bottom of the vessel, a dispersing diaphragm over said coaming, a circuitous passage formed between the dispersing diaphragm and the top of the vessel, a drum above the vessel connected with the upper end of said passage, a plurality of screens in the drum, and means for aerating the liquid and forcing the resulting foam through the circuitous passage and the drum, said passage and said drum being upwardly inclined, thereby causing surplus liquid to return to the bottom of the vessel.

9. An apparatus of the class described, comprising a closed vessel adapted to receive a suitable liquid for making saponaceous foam, a coaming raised above the bottom of the vessel, a dispersing diaphragm over said coaming, a circuitous passage formed between the dispersing diaphragm and the top of the vessel, a drum above the vessel connected with the upper end of said passage, and means for aerating the liquid and forcing the resulting foam through the circuitous passage and the drum, said passage and said drum being upwardly inclined, thereby causing surplus liquid to return to the bottom of the vessel; said aerating means including a source of compressed air, and a suitable conduit for the air leading into the vessel beneath the coaming.

10. An apparatus of the class described, comprising a closed vessel adapted to receive a suitable liquid for making saponaceous foam, a coaming raised above the bottom of the vessel, a dispersing diaphragm over said coaming, a circuitous passage formed between the dispersing diaphragm and the top of the vessel, a drum above the vessel connected with the upper end of said passage and means for aerating the liquid and forcing the resulting foam through the circuitous passage and the drum, said passage and said drum being upwardly inclined, thereby causing surplus liquid to return to the bottom of the vessel; said aerating means including an air compressor, and a suitable conduit for the air entering beneath the coaming in the vessel.

11. In an apparatus of the class described, comprising a closed vessel adapted to receive a suitable liquid for making saponaceous foam, a coaming raised above the bottom of the vessel, a dispersing diaphragm over said coaming, a circuitous passage formed between the dispersing diaphragm and the top of the vessel, a drum above the vessel connected with the upper end of said passage, a plurality of screens in the drum, and means for aerating the liquid and forcing the resulting foam through the circuitous passage and the drum, said passage and said drum being upwardly inclined, thereby causing surplus liquid to return to the bottom of the vessel; said aerating means including an air compressor, and a suitable conduit for the air entering beneath the coaming in the vessel.

12. An apparatus of the class described, comprising a closed vessel adapted to receive a suitable liquid for making saponaceous foam, a coaming raised above the bottom of the vessel, a dispersing diaphragm over said coaming, a helical passage formed between the dispersing diaphragm and the top of the vessel, a drum above the vessel connected with the upper end of said passage, a plurality of screens in the drum, and means for aerating the liquid and forcing the resulting foam through the circuitous passage and the drum, said passage and said drum being upwardly inclined, thereby causing surplus liquid to return to the bottom of the vessel; said aerating means including an air compressor and a suitable conduit for the air entering beneath the coaming in the vessel.

13. An apparatus of the class described, comprising a closed vessel adapted to receive a suitable liquid for making saponaceous foam, a dispersing diaphragm in the vessel, a grid above the dispersing diaphragm, a circuitous passage formed between the filter and the top of the vessel, a drum connected with the vessel having a plurality of screens, and means for aerating the liquid and forcing the same through the circuitous passage and the screens in the order given.

14. In an apparatus of the class described, comprising a closed vessel adapted to continuously receive a suitable liquid for making saponaceous foam, a dispersing diaphragm in the vessel, a grid above the dispersing diaphragm, a circuitous passage formed between the dispersing diaphragm and the top of the vessel, a drum connected with the vessel having a plurality of screens, and means for aerating the liquid and forcing the same through the circuitous passage and the screens in the order given.

15. An apparatus of the class described, comprising a closed vessel adapted to receive a suitable liquid for making saponaceous foam, a dispersing diaphragm in the vessel, a grid above the dispersing diaphragm, a circuitous passage formed between the dispersing diaphragm and the top of the vessel, a drum connected with the vessel having a plurality of screens and means for aerating the liquid and forcing the same through the circuitous passage and the screens in the order given, and means for continuously charging the vessel with said suitable liquid.

16. An apparatus of the class described comprising a closed vessel adapted to receive a suitable liquid for making saponaceous foam, a dispersing diaphragm in the vessel, a grid above the dispersing diaphragm, a circuitous passage formed between the dispersing diaphragm and the top of the vessel, a drum connected with the vessel having a plurality of screens and means for aerating the liquid and forcing the same through the circuitous passage and the screens in the order given, and means for continuously charging the vessel with said suitable liquid, said means consisting of a hydrostatic pressure container.

17. In an apparatus for continuously forming a comminuted foam, a container, means to supply a foaming liquid to the container, means to supply compressed subdivided air below the surface of the foaming liquid, a circuitous passage adapted to carry the resulting foam upwardly in the vessel actuated by said air supply means to subdivide and drain such foam.

18. In an apparatus of the class described, comprising a closed vessel adapted to receive a suitable liquid for making saponaceous foam, a circuitous baffle in said vessel, a screen beyond the vessel, and means for aerating the liquid and forcing the resultant foaming liquid through the baffle and the screen.

19. In an apparatus of the class described, comprising a closed vessel adapted to receive a suitable liquid for making saponaceous foam, a circuitous baffle in said vessel, a screen beyond the vessel, and means for aerating the liquid and forcing the resultant foaming liquid upwardly through the baffle and the screen, thereby causing surplus liquid to return to the bottom of the vessel.

In witness whereof, I have hereunto set my hand and seal at Los Angeles, Los Angeles County, California, this 2nd day of September, A. D. nineteen hundred and twenty-six.

JOHN A. RICE.